United States Patent
Tsuji et al.

(10) Patent No.: US 12,077,697 B2
(45) Date of Patent: Sep. 3, 2024

(54) DIVERTING AGENT AND METHOD OF FILLING FRACTURE IN WELL USING THE SAME

(71) Applicant: MITSUBISHI CHEMICAL CORPORATION, Tokyo (JP)

(72) Inventors: Kazutoshi Tsuji, Tokyo (JP); Norihito Sakai, Tokyo (JP); Tomoya Fujita, Tokyo (JP); Takahiro Saka, Tokyo (JP); Chizuko Furo, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 18/090,917

(22) Filed: Dec. 29, 2022

(65) Prior Publication Data

US 2023/0147740 A1 May 11, 2023

Related U.S. Application Data

(63) Continuation of application No. 16/782,415, filed on Feb. 5, 2020, now Pat. No. 11,597,870, which is a continuation of application No. PCT/JP2018/030142, filed on Aug. 10, 2018.

(30) Foreign Application Priority Data

Aug. 10, 2017 (JP) ................. 2017-155040
Dec. 28, 2017 (JP) ................. 2017-254842
Dec. 28, 2017 (JP) ................. 2017-254843

(51) Int. Cl.
*C09K 8/72* (2006.01)
*C08F 16/06* (2006.01)
*C09K 8/68* (2006.01)
*E21B 43/26* (2006.01)

(52) U.S. Cl.
CPC .............. *C09K 8/725* (2013.01); *C08F 16/06* (2013.01); *C09K 8/68* (2013.01); *E21B 43/26* (2013.01); *E21B 43/261* (2013.01)

(58) Field of Classification Search
None
See application file for complete search history.

(56) References Cited

U.S. PATENT DOCUMENTS

| | | | |
|---|---|---|---|
| 10,550,038 B2 * | 2/2020 | Saka ............... | C08F 8/48 |
| 11,174,423 B2 | 11/2021 | Tamai | |
| 11,261,270 B2 * | 3/2022 | Takayama ......... | C08F 2/38 |
| 2006/0017505 A1 | 1/2006 | Kamakura et al. | |
| 2006/0128598 A1 | 6/2006 | Chen et al. | |
| 2006/0175059 A1 * | 8/2006 | Sinclair ............ | E21B 43/261 |
| | | | 166/313 |
| 2006/0175579 A1 | 8/2006 | Nunez et al. | |
| 2009/0093609 A1 * | 4/2009 | Shibutani .......... | C08F 216/38 |
| | | | 528/246 |
| 2012/0181034 A1 | 7/2012 | Bour et al. | |
| 2014/0076570 A1 | 3/2014 | Nguyen | |
| 2015/0159070 A1 | 6/2015 | Saito et al. | |
| 2016/0108165 A1 | 4/2016 | Takahashi et al. | |
| 2016/0138376 A1 | 5/2016 | Al-Nakhli et al. | |
| 2016/0298017 A1 | 10/2016 | Takahashi et al. | |
| 2017/0037294 A1 | 2/2017 | Mandai et al. | |
| 2017/0150713 A1 | 6/2017 | Saka et al. | |
| 2017/0210965 A1 | 7/2017 | Cortez et al. | |
| 2017/0253703 A1 | 9/2017 | Yoshikawa et al. | |
| 2018/0010037 A1 | 1/2018 | Yoshikawa et al. | |
| 2018/0362404 A1 | 12/2018 | Saka et al. | |
| 2019/0153290 A1 | 5/2019 | Katou et al. | |
| 2020/0216584 A1 * | 7/2020 | Takayama .......... | C08F 2/38 |
| 2020/0325383 A1 | 10/2020 | Saka et al. | |
| 2021/0309910 A1 * | 10/2021 | Hirano ............. | C09K 8/5083 |
| 2021/0363411 A1 | 11/2021 | Mandai et al. | |

FOREIGN PATENT DOCUMENTS

| | | |
|---|---|---|
| CN | 102695727 | 9/2012 |
| CN | 104727800 | 6/2015 |
| CN | 105441043 | 3/2016 |
| CN | 105441047 | 3/2016 |
| CN | 106350043 | 1/2017 |
| CN | 111527181 | 8/2020 |
| CN | 111763506 | 10/2020 |
| CN | 113412285 | 9/2021 |
| JP | 2016-056272 | 4/2016 |
| JP | 2016-147971 | 8/2016 |
| JP | 2016-147972 | 8/2016 |
| JP | 2017-048267 | 3/2017 |
| WO | 2011/118598 | 9/2011 |
| WO | 2015/072317 | 5/2015 |
| WO | 2016/027720 | 2/2016 |

OTHER PUBLICATIONS

Office Action issued in JP Patent Application No. 2018-543180, Jan. 4, 2023, translation.
Sugama, T. et al., "Role of PVA Flakes in Promoting Self-Degradation of Sodium Metasilicate-Activated Cement under a Hydrothermal Environment at ≥150° C.", Journal of Technology Innovations in Renewable Energy, vol. 2, No. 4, 2013, pp. 352-365.
ISR issued in WIPO Patent Application No. PCT/JP2018/030142, dated Oct. 2, 2018, English translation.
Written Opinion issued in WIPO Patent Application No. PCT/JP2018/030142, dated Oct. 2, 2018.
IPRP issued in WIPO Patent Application No. PCT/JP2018/030142, dated Feb. 11, 2020, English translation.
EESR issued in EP Application No. 18845246.0, Jul. 13, 2020.

(Continued)

*Primary Examiner* — John J Figueroa
(74) *Attorney, Agent, or Firm* — GREENBLUM & BERNSTEIN, P.L.C.

(57) ABSTRACT

A problem to be solved of the present invention is to provide a diverting agent which gradually dissolves in water. The present invention relates to a diverting agent containing a polyvinyl alcohol-based resin and a method of filling a fracture using the diverting agent.

12 Claims, No Drawings

(56) References Cited

OTHER PUBLICATIONS

Office Action issued in SG Patent App. No. 11202001095U, issued Oct. 26, 2020; mailed Nov. 9, 2020.
Office Action issued in Chinese Application No. 201880051662.8, dated Jan. 21, 2022, with English translation.
Dai Zhenzhen, Synthesis and Application of Superabsorbent Resin, 2012, with English translation.
Office Action issued in Japanese Application No. 2018-543180, dated Apr. 26, 2022, with English translation.
Office Action issued in European Application No. 18845246.0, dated May 25, 2022, with English translation.
Office Action issued in SG Application No. 11202001095U, dated Aug. 15, 2022 (English).
Chinese Office Action Chinese Application No. 201880051662.8, issued on Jul. 12, 2023, English translation.
Office Action issued in EP Patent Application No. 18845246.0, Feb. 14, 2024.

\* cited by examiner

DIVERTING AGENT AND METHOD OF FILLING FRACTURE IN WELL USING THE SAME

CROSS REFERENCE TO RELATED APPLICATIONS

This is a Continuation of U.S. patent application Ser. No. 16/782,415, filed Feb. 5, 2020, which is a Continuation of International Pat. Appl. No. PCT/JP2018/030142, filed Aug. 10, 2018, and claims the priority benefit of Japanese Pat Appl. Nos.: 2017-155040, filed Aug. 10, 2017; 2017-254842, filed Dec. 28, 2017; and 2017-254843, filed Dec. 28, 2017. The entire disclosure of each of the above-identified applications, including the specification, drawings, and claims, is incorporated herein by reference in its entirety.

TECHNICAL FIELD

The present invention relates to a diverting agent and a method of filling a fracture in well using the diverting agent. More specifically, the present invention relates to a diverting agent employed at the time of construction of excavation method using a hydraulic fracturing method, and a method of filling a well fracture using the diverting agent.

BACKGROUND ART

For collecting petroleum or other underground resources, a hydraulic fracturing method in which high-pressure water is injected into an underground shale layer to cause fractures is widely adopted. In the hydraulic fracturing method, at first, a vertical hole (vertical well) with a depth of several thousand meters is excavated vertically by a drill, and then, when the vertical hole reaches the shale layer, a horizontal hole (horizontal well) with a diameter of ten to several tens of centimeters is excavated horizontally. By filling vertical and horizontal wells with fluid and pressurizing the fluid, fractures are generated from the well. Natural gas, petroleum (shale gas/oil), or the like in the shale layer flows out from the fracture, and is collected. According to such a method, a resource inflow cross-section of wells can be increased by generation of fractures and underground resources can be efficiently collected.

In the hydraulic fracturing method described above, prior to generation of fractures due to fluid pressurization, preliminary blasting called perforation is performed in a horizontal well. By such preliminary blasting, borings are made from the well to a production layer. After that, by injecting the fracturing fluid into the well, the fluid flows into these borings, and a load is applied to the borings. Then, fractures are generated in these borings and grow into fractures in a size suitable for resource collection.

In the hydraulic fracturing method, a part of fractures that has already been generated is temporarily filled with an additive called a diverting agent in order to grow fractures that have already been generated larger or to generate more fractures. By temporarily filling a part of the fractures with the diverting agent and pressurizing the fracturing fluid filled in the well in the state, fluid may enter into the other fractures, so that other fractures can grow large or new fractures can be generated.

Since the diverting agent is used to temporarily fill the fractures as described above, a diverting agent which can maintain the shape for a certain period of time and disappears by hydrolysis when a natural gas, petroleum, or the like is collected is used. For example, various techniques in which a hydrolyzable resin such as polyglycolic acid or polylactic acid is used as a divergent agent have been proposed.

Patent Literature 1 has proposed a temporary sealing agent for use in well boring which contains polyglycolic acid having high biodegradability among a biodegradable aliphatic polyester-based resin.

Patent Literature 2 has proposed a powder containing particles of polylactic acid which is a biodegradable resin, the powder in which 50 mass % or more of particles do not pass through a sieve having an opening of 500 μm and the particles have an angle of repose of 51 degree or more.

Furthermore, Patent Literature 3 has proposed hydrolyzable particles having a dispersion structure in which fine particles of a polyoxalate having a high biodegradability for adjusting the degree of hydrolysis of the polylactic acid are distributed in polylactic acid, and having an average particle size ($D_{50}$) of 300 μm to 1000 μm and a roundness in which a minor axis/major axis ratio is 0.8 or more.

Moreover, Patent Literature 4 has proposed a polyoxalate particles having an average particle diameter (D50) in a range of 300 μm to 1000 μm and a roundness in which a minor axis/major axis ratio is 0.8 or more.

CITATION LIST

Patent Literature

Patent Literature 1: WO 2015/072317
Patent. Literature 2: JP-A-2016-56272
Patent Literature 3: JP-A-2016-147971
Patent Literature 4: JP-A-2016-147972

SUMMARY OF INVENTION

Technical Problem

As described above, the diverting agent is used to temporarily fill fractures formed in the shale layer. Therefore, the shape of the diverting agent needs to be maintained immediately after being added to water. On the other hand, the diverting agent is preferably removed when petroleum, natural gas or the like is collected.

That is, a diverting agent that is only partially dissolved in water, can fill fractures for a certain period of time (approximately 30 minutes to 1 week) and can be removed by dissolving in water after a certain period of time is required.

However, the temporary sealant described in Patent Literature 1, the powder described in Patent Literature 2, the hydrolyzable particles described in Patent Literature 3, and polyoxalate particles described in Patent Literature 4 do not dissolve in water, and the biodegradation rate of these are slow in the low temperature range, so that it takes long time to remove them.

The present invention has been made in view of the above conventional circumstances, and a problem to be solved of the present invention is to provide a diverting agent that is only partially dissolved in water, can fill fractures for a certain period of time (approximately 30 minutes to 1 week) and can be removed by dissolving in water after a certain period of time.

Solution to Problem

The present inventors have made intensive studies to solve the above problems, as a result, it has been found that the above problems can be solved when a diverting agent contains a polyvinyl alcohol-based resin. The present invention has been accomplished based on this finding.

That is, the present invention relates to the following <1> to <13>.

<1> A diverting agent including: a polyvinyl alcohol-based resin.

<2> The diverting agent according to <1>, in which the polyvinyl alcohol-based resin has a saponification degree of 90 mol % or more.

<3> The diverting agent according to <1> or <2>, in which the polyvinyl alcohol-based resin has a dissolution rate of 0.1 mass % to 30 mass %, when 4 g of the polyvinyl alcohol-based resin is charged into 96 g of water and is stirred for 180 minutes at 40° C.

<4> The diverting agent according to any one of <1> to <3>, in which a degree of crystallinity of the polyvinyl alcohol-based resin is 25% to 60%.

<5> The diverting agent according to <1>, in which when 1 g of the polyvinyl alcohol-based resin is immersed in 100 g of water at 40° C., a ratio of a dissolution rate after 24 hours with respect to a dissolution rate after 1 hour of the polyvinyl alcohol-based resin is 2.8 or more.

<6> The diverting agent according to <5>, in which when 1 g of the polyvinyl alcohol-based resin is immersed in 100 g of water at 40° C., the dissolution rate after 1 hour is less than 30 mass %.

<7> The diverting agent according to <5> or <6>, in which when 1 g of the polyvinyl alcohol-based resin is immersed in 100 g of water at 40° C., the dissolution rate after 24 hours is 30 mass % or more.

<8> The diverting agent according to any one of <5> to <7>, in which the polyvinyl alcohol-based resin is a modified polyvinyl alcohol-based resin.

<9> The diverting agent according to <8>, in which a modification rate of the modified polyvinyl alcohol-based resin is 0.5 mol % to 10 mol %.

<10> The diverting agent according to <1>, in which the polyvinyl alcohol-based resin satisfies the following formula (A).

$$\text{Degree of swelling} \times \text{elution rate (mass \%)} \leq 500 \qquad (A)$$

(In the formula (A), the degree of swelling is a value determined according to the following formula (B), and the elution rate (mass %) is a value determined according to the following formula (C).)

[Equation 1]

$$\text{Degree of swelling} = \frac{\text{Mass (g) of polyvinyl alcohol-based resin after swelling} - \text{mass (g) of polyvinyl alcohol-based resin dried after swelling}}{\text{mass (g) of polyvinyl alcohol-based resin dried after swelling}} \qquad (B)$$

(In the formula (B), the mass (g) of the polyvinyl alcohol-based resin after swelling is a mass (g) of a residual polyvinyl alcohol-based resin obtained by charging 1 g of a polyvinyl alcohol-based resin into 100 g of water, leaving it to stand for 1 day in a thermostatic chamber at 23° C. and collecting by filtration. The mass (g) of the polyvinyl alcohol-based resin dried after swelling is a mass (g) after the residual polyvinyl alcohol-based resin is dried at 140° C. for 3 hours.)

[Equation 2]

$$\text{Elution rate (mass \%)} = \left\{ \frac{1 (g) - \dfrac{\text{Mass (g) of polyvinyl alcohol-based resin dried after swelling}}{\dfrac{\text{Solid fraction (mass \%) of polyvinyl alcohol-based resin}}{100}}}{1 (g)} \right\} \times 100 \qquad (C)$$

(In the formula (C), the mass (g) of the polyvinyl alcohol-based resin dried after swelling is the same as defined in the formula (B).)

<11> The diverting agent according to <10>, in which the elution rate of the polyvinyl alcohol-based resin is 50 mass % or less.

<12> The diverting agent according to <10> or <11>, in which the degree of swelling of the polyvinyl alcohol-based resin is 30 or less.

<13> A method of filling a fracture which is a method of temporarily filling the fracture generated in a well, including allowing the diverting agent according to any one of <1> to <12> to flow into a fracture to be filled with a flow of fluid in the well.

Advantageous Effects of Invention

According to the present invention, a diverting agent that is only partially dissolved in water, can fill fractures for a certain period of time (approximately 30 minutes to 1 week) and can be removed by dissolving in water after a certain period of time can be provided by using a polyvinyl alcohol-based resin.

Moreover, by using a polyvinyl alcohol-based resin in which the ratio of the dissolution rate after 24 hours with respect to the dissolution rate after 1 hour described later is a certain level or more, a diverting agent of which the shape can be maintained for approximately one hour after addition to water and the dissolution rate in water after approximately 24 hours is increased can be provided.

Furthermore, by using a polyvinyl alcohol-based resin satisfying a specific formula relating to the degree of swelling and the elution rate, a diverting agent having good dispersibility in water can be provided.

DESCRIPTION OF EMBODIMENTS

Hereinafter, the present invention is described in detail below, but these are preferred and exemplary embodiments, and the present invention is not limited to these contents.

In the present invention, (meth)allyl means allyl or methallyl, (meth)acryl means acryl or methacryl, and (meth)acrylate means acrylate or methacrylate.

In the present invention, "mass" is synonymous with "weight".

Polyvinyl Alcohol-Based Resin

The diverting agent of the present invention contains a polyvinyl alcohol (hereinafter sometimes referred to as PVA)-based resin. Since the diverting agent of the present invention contains a PVA-based resin, the agent is water-soluble.

Furthermore, since the diverting agent of the present invention contains a PVA-based resin, the diverting agent is only partially dissolved in water, can fill fractures for a certain period of time (approximately 30 minutes to 1 week) and can be removed by dissolving in water after a certain period of time, even in a relatively low temperature region (for example, 30° C. to 60° C.).

In collecting petroleum, natural gas or the like, the diverting agent of the present invention is used to fill the fracture in the ground. However, the diverting agent of the present invention dissolves in water, and does not remain in the ground for a long period of time. Therefore, the diving agent of the present invention is very useful and has a very small environmental load.

The PVA-based resin used in the present invention preferably satisfies the following embodiment (i).

Embodiment (i): A PVA-Based Resin Having a Dissolution Rate of 0.1 Mass % to 30 Mass %, when 4 g of the PVA-Based Resin is Charged into 96 g of Water and is Stirred for 180 Minutes at 40° C.

The PVA-based resin of the embodiment (i) is described in detail below.

The above dissolution rate is more preferably from 1 mass % to 20 mass %, and further preferably from 2 mass % to 10 mass %. When the dissolution rate is too low, the diverting agent tends to remain even after its role of filling fractures in the well is completed, and when the dissolution rate is too high, the filling period tends to be very short.

The method for measuring the dissolution rate is as follows.
(1) 4 g of the PVA-based resin is charged into 96 g of water at 40° C.
(2) The mixture is stirred for 180 minutes while the temperature of the water is kept at 40° C.
(3) After stirring for 180 minutes, the undissolved residue is filtered and the concentration of the aqueous solution excluding the residue is measured.

The concentration of the aqueous solution is calculated from the following formula by weighing and collecting an appropriate amount of a PVA-based resin aqueous solution, putting the solution in a drier at 105° C. and drying for 3 hours, cooling to room temperature, and then measuring the mass of the dried residue.

The concentration (mass %) of the aqueous solution=mass (parts) of dry residue/mass (parts) of the weighted and collected aqueous solution of PVA-based resin×100

(4) The amount of the residue is calculated from the aqueous solution concentration and the charged amount of the PVA-based resin, and the dissolution rate is obtained.

The degree of crystallinity of the PVA-based resin used in the embodiment (i) is preferably 25% to 60%, more preferably 30% to 55%, still more preferably 35% to 50%, and particularly preferably 40% to 50%.

When the degree of crystallinity is too low, the sealing effect tends to decrease, and when the degree of crystallinity is too high, the water dissolution rate tends to decrease.

The degree of crystallinity is calculated by the following formula by measuring the heat of fusion ($\Delta H$) (J/g) of the target PVA-based resin at the melting point.

Degree of Crystallinity (%)=$\Delta H/\Delta H_0 \times 100$ ($\Delta H_0$ is a heat of fusion of 156.7 (J/g) of the PVA-based resin having a saponification degree of 100 mol %.)

The heat of fusion ($\Delta H$) (J/g) of the PVA-based resin at the melting point is measured using a differential scanning calorimeter (DSC).

First, 5 mg of a sample to be measured is weighed and collected in a measurement container. The measurement start temperature is −30° C., and the temperature is raised at a temperature rising rate of 10° C./min and arrived at an attainment temperature of 200° C. to 240° C. (30° C. higher than the melting point). Thereafter, the temperature is lowered to the measurement start temperature at a temperature decreasing rate of 10° C./min. The temperature is raised again to a temperature of approximately 30° C. higher than the melting point at a temperature rising rate of 10° C./min. The endothermic peak area of the melting point at the second temperature rise is calculated as the heat of fusion $\Delta H$ (J/g).

In the calculation of the heat of fusion ($\Delta H$), first, the horizontal axis of the analysis chart is defined as a temperature axis, a point at which the temperature is 5° C. higher than the temperature of the end point of the endothermic peak of the DSC curve is defined as point A, a point at which the temperature is 40° C. lower than the temperature of the vertex of the endothermic peak of the DSC curve is set as point B, and a straight line connecting these two points is defined as a base line. The heat of fusion ($\Delta H$) (J/g) is calculated from the area of the portion surrounded by the base line and the endothermic peak.

The melting point of the PVA-based resin used in the embodiment (i) is usually 140° C. to 250° C., preferably 150° C. to 245° C., and more preferably 160° C. to 240° C., still more preferably 170° C. to 235° C., and particularly preferably 180° C. to 230° C.

The melting point is a value measured by a differential scanning calorimeter (DSC) at a temperature raising/decreasing rate of 10° C./min.

When the PVA-based resin used in the embodiment (i) is designed according to the purpose of use, examples of the method of adjusting the performances thereof include a method of adjusting the saponification degree of the PVA-based resin, a method of adjusting the average degree of polymerization of the PVA-based resin, a method of introducing a modifying group into the PVA-based resin, a method of performing heat treatment on the PVA-based resin, and a method of forming core-shell particles using the PVA-based resin. In the present application, the core-shell particles refer to particles composed of a core portion and a shell portion provided on a surface thereof.

The saponification degree (measured according to JIS K 6726) of the PVA-based resin used in the embodiment (i) is usually 70 mol % or more, preferably 90 mol % or more, more preferably 95 mol % or more, and still more preferably 98 mol % or more.

When the saponification degree of the PVA-based resin used in the embodiment (i) is high, the dissolution rate after 1 hour of the PVA-based resin can be lower, and temporary filling by the diverting agent of the embodiment (i) in the fracture of the shale layer can be efficiently performed. When the saponification degree of the PVA-based resin used in the embodiment (i) is high, the dispersibility of the PVA-based resin in water is good.

When the saponification degree of the PVA-based resin used in the embodiment (i) is too low, the water solubility of the PVA-based resin is low, and it tends to take time to be removed.

From the viewpoint of production efficiency, the saponification degree of the PVA-based resin used in the embodiment (i) is preferably 99.9 mol % or less, more preferably 99.8 mol % or less, and still more preferably 99.5 mol % or less.

The average degree of polymerization of the PVA-based resin used in the embodiment (i) is generally from 150 to 4000, preferably from 200 to 3000. In the present specification, the average degree of polymerization of the PVA-based resin is calculated from the viscosity of an aqueous solution of 4 mass % at 20° C. measured based on JIS K 6726.

The PVA-based resin used in the embodiment (i) may be an unmodified PVA or a modified PVA-based resin.

Examples of the modified PVA-based resin include a copolymer-modified PVA-based resin and a post-modified PVA-based resin.

The copolymer-modified PVA-based resin can be produced by copolymerizing a vinyl ester monomer such as vinyl acetate and other unsaturated monomers copolymerizability with the vinyl ester monomer and then performing saponification.

The post-modified PVA-based resin can be produced by reacting an unmodified PVA with a modified monomer.

Examples of the other unsaturated monomers having copolymerizability with the above-mentioned vinyl ester monomer include olefins such as ethylene, propylene, isobutylene, α-octene, α-dodecene, and α-octadecene; unsaturated acids such as acrylic acid, methacrylic acid, crotonic acid, maleic acid, maleic anhydride, itaconic acid, undecylenic acid, or a salt thereof, monoester thereof or dialkyl ester thereof; nitriles such as acrylonitrile and methacrylonitrile; amides such as diacetone acrylamide, acrylamide, and naethacrylamide; olefin sulfonic acids such as ethylene sulfonic acid, allyL sulfonic acid, methallyl sulfonic acid, or a salt thereof; alkyl vinyl ethers; N-acryl amide methyltrimethylammonium chloride; allyl trimethylammonium chloride; dirnethylallyl vinyl ketone; N-vinyl pyrrolidone; vinyl chloride; vinylidene chloride; polyoxyalkylene (meth)allyl ether such as polyoxyethylene (meth)allyl ether and polyoxypropylene (meth)allyl ether; polyoxyalkylene (meth)acrylate such as polyoxyethylene (meth)acrylate and polyoxypropylene (meth)acrylate; polyoxyalkylene (meth) acrylamide such as polyoxyethylene (meth)acrylamide and polyoxypropylene (meth)acrylamide; polyoxyethylene (1-(meth)acrylamide-1,1-dimethylpropyl) ester; polyoxyalkylene vinyl ether such as polyoxyethylene vinyl ether and polyoxypropylene vinyl ether; polyoxyalkylene allylamine such as polyoxyethylene allylamine and polyoxypropylene allylamine; polyoxyalkylene vinylamine such as polyoxyethylene vinylamine and polyoxypropylene vinylamine; hydroxy group-containing α-olefins such as 3-butene-1-ol, 4-penten-1-ol, and 5-hexene-1-ol, or acylated products thereof, vinyl ethylene carbonate; 2,2-dialkyl-4-vinyl-1,3-dioxolane; glycerin monoallyl ether; vinyl compounds such as 3,4-diacetoxy-1-butene; isopropenyl acetate; substituted vinyl acetates such as 1-methoxy vinyl acetate; 1,4-diacetoxy-2-butene; and vinylene carbonate.

Examples of the copolymer-modified PVA-based resin include a PVA-based resin having a primary hydroxyl group in a side chain thereof. Examples of the PVA-based resin include a PVA-based resin having a 1,2-diol structure in a side chain obtained by copolymerization of 3,4-diacetoxy-1-butene, vinylethylene carbonate, glycerin monoallyl ether, or the like; and a PVA-based resin having a hydroxymethyl group in a side chain obtained by copolymerization of a hydroxymethylvinylidene diacetate such as 1,3-diacetoxy methylenepropane, 1,3-dipropionyloxy-2-methylenepropane, and 1,3-dibutyroyloxy methylenepropane or the like.

The post-modified PVA resin can be produced by post-modification of an unmodified PVA. Examples of such post-modification methods include acetoacetate esterification, acetalization, urethanization, etherification, phosphate esterification, and oxyalkylation of the unmodified PVA.

Among these, a PVA-based resin having a 1,2-diol structure in the side chain is preferred from the viewpoint that the dissolution rate can be easily controlled.

The PVA-based resin used in the embodiment (1) is usually used in the form of pellets, powder, or the like. In particular, from the viewpoint of filling, it is preferable to use the pellet form.

When powdery PVA-based resin is used as the PVA-based resin in the embodiment (i), the average particle diameter thereof is preferably 10 μm to 3000 μm, more preferably 50 to 2000 μm, and still more preferably 100 μm to 1000 μm.

When the average particle size of the PVA-based resin is too small, it tends to be difficult to handle due to scattering or the like. When the PVA-based resin is too large, the PVA-based resin is post-modified, and the reaction tends to be non-uniform when the PVA-based resin is modified.

In addition, the average particle diameter is a diameter at which a volume distribution for each particle size is measured by laser diffraction and an integrated value (cumulative distribution) is 50%.

When a pellet-shaped PVA-based resin is used as the PVA-based resin, the average degree of polymerization thereof is particularly preferably 200 to 1200, and more preferably 300 to 800. When the average degree of polymerization is too low, the water dissolution rate is too high, and the sealing effect tends to decrease. When the average degree of polymerization is too high, the water dissolution rate is too low, and the time until the dissolution and removal tends to be too long.

When a pellet-shaped PVA-based resin is used as the PVA-based resin, a known method can be used to form such a pellet shape, but it is efficient to extrude into a strand form from an extruder, cut to a predetermined length after cooling, and form columnar pellets.

The columnar pellets have a length of usually 1 mm to 4 mm, preferably 2 mm to 3 mm, and a diameter of usually 1 mm to 4 mm, preferably 2 mm to 3 mm.

The pellet-shaped PVA-based resin used in the embodiment (i) can be produced by, for example, a method of melting powder of a PVA-based resin.

Examples of the melting method include a method of mixing by a mixer such as a Henschel mixer or a ribbon blender and then melt-kneading with a melt kneader such as a single screw or a twin screw extruder, a roll, a Banbury mixer, a kneader, a Brabender mixer, or the like. The temperature at the time of melt-kneading can be appropriately set within a temperature range that is equal to or higher than the melting point of the PVA-based resin and does not thermally deteriorate, and is preferably 100° C. to 250° C., and particularly preferably 160° C. to 220° C.

When the PVA-based resin used in the embodiment (i) is produced by a heat treatment, the PVA-based resin obtained by a conventional method is subjected to heat treatment at, for example, from 90° C. to 220° C., preferably from 90° C. to 180° C., more preferably from 100° C. to 160° C., for from 10 minutes to 600 minutes, preferably from 20 minutes to 400 minutes, and more preferably from 30 minutes to 300 minutes to obtain the PVA-based resin. The heat treatment may be performed by a known method, or may be performed by melt extrusion or the like, besides a heat treatment using a heat treatment can or the like.

When the PVA-based resin used in the embodiment (i) is produced by a method to produce core-shell particles, the resin can be obtained from a known method, for example, a method described in JP-A-2017-048267.

The PVA-based resin of the present invention preferably satisfies the following embodiment (ii).

> Embodiment (ii): PVA Based Resin of which a Ratio of a Dissolution Rate after 24 Hours with Respect to a Dissolution Rate after 1 Hour is 2.8 or More, when 1 g of the Polyvinyl Alcohol-Based Resin is Immersed in 100 g of Water at 40° C.

That is, the PVA-based resin used in the embodiment (ii) is preferably a PVA-based resin satisfying the following formula (X).

$$\text{Dissolution rate (mass \%) after 24 hours/dissolution rate (mass \%) after 1 hour} \geq 2.8 \quad (X)$$

When the ratio of the dissolution rate after 24 hours with respect to the dissolution rate after 1 hour of the PVA-based resin used in the embodiment (ii) is 2.8 or more, the PVA-based resin tends to maintain the shape thereof for approximately 1 hour after the addition to water, and increase dissolution rate in water after approximately 24 hours.

Therefore, the diverting agent of the embodiment (ii) containing the PVA-based resin can maintain the shape thereof for a certain period of time, and can be dissolved in water when petroleum, natural gas or the like is collected.

From the viewpoint of further increasing the dissolution rate in water after approximately 24 hours, the ratio of the dissolution rate after 24 hours with respect to the dissolution rate after 1 hour is more preferably 3.0 or more, still more preferably 3.5 or more, and particularly preferably 4.0 or more.

In addition, the ratio of the dissolution rate after 24 hours with respect to the dissolution rate after 1 hour is preferably 20 or less, and more preferably 10 or less, since if the dissolution is too fast, the duration of the sealing effect is too short.

In the formula (X), the dissolution rate after 1 hour is calculated from the ratio of mass (mass %) of the PVA-based resin remaining without being dissolved, after 1 g of the PVA-based resin is immersed in 100 g of water of 40° C. and the mixture is left to stand for 1 hour. Specifically, the dissolution rate (mass %) after 1 hour can be calculated by the following method.

A 140 mL glass container with a lid containing 100 g of water is placed in a thermostatic chamber, and the water temperature is set to 40° C. The long sides of 120 mesh (aperture 125 μm, 1.0 cm×7 cm) made of nylon are folded in half, and both ends are heat-sealed to obtain a mesh bag (5 cm×7 cm).

1 g of the PVA-based resin is put into the obtained mesh bag, the opening is heat-sealed to obtain a mesh bag containing the PVA-based resin, and then the mass is measured. The mesh bag containing the PVA-based resin is immersed in the glass container. After standing for 1 hour, the mesh bag containing the PVA-based resin is taken out from the glass container and then dried at 105° C. for 3 hours. The mass of the mesh bag containing the PVA-based resin is measured, the mass of the PVA-based resin remaining in the mesh bag is calculated from the mass before the immersion, then the dissolution rate (mass %) after 1 hour of the PVA-based resin is calculated by the following formula (Y).

In the following formula (Y), the solid fraction (mass %) of the polyvinyl alcohol-based resin can be calculated by drying the PVA-based resin at 105° C. for 3 hours and measuring the mass of the PVA-based resins before and after drying.

[Equation 3]

$$\text{Dissolution rate after 1 hour of the immersion (mass \%)} = \left\{ \frac{1(g) - \dfrac{\text{Mass (g) of the polyvinyl alcohol-based resin remaining in the mesh bag}}{\text{Solid fraction (mass \%) of polyvinyl alcohol-based resin}}}{1(g) \times \dfrac{\text{alcohol-based resin}}{100}} \right\} \times 100 \quad (Y)$$

Further, in the formula (X), the dissolution rate (mass %) after 24 hours can be calculated in the same manner as the calculation of the dissolution rate (mass %) after 1 hour except that standing for 1 hour is changed to standing for 24 hours and by calculating the mass of the PVA-based resin remaining in the mesh bag after 24 hours.

The dissolution rate after 1 hour of the PVA-based resin used in the embodiment (ii) is preferably less than 30 mass %, more preferably 25 mass % or less, and still more preferably 20 mass % or less.

When the dissolution rate after 1 hour is less than 30 mass %, the shape of the PVA-based resin can be maintained for a certain period of time, and it can be efficiently performed to temporarily fill the fractures of the shale layer by the diverting agent of the embodiment (ii).

The dissolution rate after 1 hour of the PVA-based resin used in the embodiment (ii) is preferably 0.01 mass % or more, more preferably 0.1 mass % or more, and still more preferably 1 mass % or more, since when the dissolution is too slow, the sealing period is too long.

The dissolution rate after 24 hours of the PVA-based resin used in the embodiment (ii) is preferably 30 mass % or more, more preferably 40 mass % or more, and still more preferably 50 mass % or more.

When the dissolution rate after 24 hour is 30 mass % or more, the diverting agent of the embodiment (ii) can be efficiently removed, when the oil, natural gas, or the like is collected.

The dissolution rate after 24 hours of the PVA-based resin used in the embodiment (ii) is preferably 99 mass % or less, more preferably 90 mass % or less, still more preferably 80 mass % or less, and particularly preferably 70 mass % or less, since when the dissolution is too fast, the sealing period is too short.

Examples of the method of adjusting the ratio of the dissolution rate after 24 hours with respect to the dissolution rate after 1 hour include a method of adjusting the degree of saponification of the PVA-based resin, a method of adjusting the average degree of polymerization of the PVA-based resin, a method of introducing a modifying group into the PVA-based resin, a method of performing heat treatment on the PVA-based resin, and a method of forming core-shell particles using the PVA-based resin.

When the PVA-based resin satisfying the formula (X) is used, the average degree of polymerization (measured based on JIS K 6726) of the PVA-based resin is preferably 450 or more, more preferably 700 or more, and still more preferably 1000 or more.

When the average degree of polymerization of the PVA-based resin is 450 or more, the dissolution rate after 1 hour of the PVA-based resin can be lower, and it can be efficiently performed to temporarily fill the fractures of the shale layer by the diverting agent of the embodiment (ii).

The average degree of polymerization of the PVA-based resin is preferably 4000 or less, more preferably 3000 or less, and still more preferably 2500 or less from the viewpoint of preventing the dissolution rate after 24 hours from being too low.

The degree of saponification of the PVA-based resin used in the embodiment (ii) (measured according to JIS K 6726) is usually 70 mol % or more, preferably 90 mol % or more, more preferably 95 mol % or more, and still more preferably 98 mol % or more. From the viewpoint of production efficiency, the upper limit of the degree of saponification is preferably 99.9 mol % or less, more preferably 99.8 mol % or less, and still more preferably 99.5 mol % or less.

When the PVA-based resin used in the embodiment (ii) is produced by a heat treatment, the PVA-based resin can be obtained by subjecting a PVA-based resin obtained by a conventional method to heat treatment at 90° C. to 220° C., preferably 90° C. to 180° C., and still more preferably 100° C. to 160° C., for preferably 10 minutes to 600 minutes, more preferably 20 minutes to 400 minutes, and more preferably 30 minutes to 300 minutes. The heat treatment may be performed by a known method, or may be performed by melt extrusion or the like, besides a heat treatment using a heat treatment can or the like.

The PVA-based resin used in the embodiment (ii) may be an unmodified PVA or a modified PVA-based resin, and is preferably a PVA-based resin having a 1,2-diol structure in a side chain thereof.

When the PVA-based resin used in the embodiment (ii) is produced by a method to produce core-shell particles, the resin can be obtained from a known method, for example, a method described in JP-A-2017-048267.

The PVA-based resin used in the present invention preferably satisfies the following embodiment (iii).

Embodiment (iii): A PVA-Based Resin Satisfying the Following Formula (A)

$$\text{Degree of Swelling} \times \text{Elution Rate (Mass \%)} \leq 500 \quad (A)$$

In the formula (A), the degree of swelling is a value obtained by the following formula (B).

[Equation 4]

$$\text{Degree of swelling} = \frac{\text{Mass (g) of polyvinyl alcohol-based resin after swelling} - \text{mass (g) of polyvinyl alcohol-based resin dried after swelling}}{\text{mass (g) of polyvinyl alcohol-based resin dried after swelling}} \quad (B)$$

In the formula (B), the mass (g) of the polyvinyl alcohol-based resin after swelling is a mass (g) of a residual polyvinyl alcohol-based resin obtained by charging 1 g of a polyvinyl alcohol-based resin into 100 g of water, leaving it to stand for 1 day in a thermostatic chamber at 23° C. and collecting by filtration.

In the formula (B), the mass (g) of the polyvinyl alcohol-based resin dried after swelling is a mass (g) after the residual polyvinyl alcohol-based resin is dried at 140° C. for 3 hours.

In the formula (A), the elution rate (mass %) is a value obtained by the following formula (C).

[Equation 5]

$$\text{Elution rate (mass \%)} = \left\{ \frac{1\,(g) - \dfrac{\text{Mass (g) of polyvinyl alcohol-based resin dried after swelling}}{\text{Solid fraction (mass \%) of polyvinyl alcohol-based resin}}}{1\,(g) \times \dfrac{}{100}} \right\} \times 100 \quad (C)$$

In the formula (C), the mass (g) of the polyvinyl alcohol-based resin dried after swelling is the same as defined in the formula (B).

In the formula (C), the solid fraction (mass %) of the polyvinyl alcohol-based resin can be calculated by drying the PVA-based resin at 105° C. for 3 hours and measuring the mass of the PVA-based resins before and after drying.

When the value of the degree of swelling×elution rate (mass %) of the PVA-based resin used in the embodiment (iii) is 500 or less, after the PVA-based resin aqueous solution is allowed to stand for one day, swelling and elution of the PVA-based resin can be suppressed and adhesion of the PVA-based resin to each other can be suppressed, and thus the dispersibility of the diverting agent in the embodiment (iii) in water can be increased.

From the viewpoint of increasing the dispersibility, the value of the degree of swelling×the elution rate (mass %) is more preferably 0 to 500, still more preferably 1 to 480, and particularly preferably 2 to 400.

The degree of swelling of the PVA-based resin used in the embodiment (iii) is preferably 30 or less, more preferably 20 or less, and still more preferably 10 or less.

When the degree of swelling of the PVA-based resin used in the embodiment (iii) is 30 or less, excessive enlargement of the PVA-based resin by water can be suppressed, and the load on the pump for feeding water or the diverting agent of the embodiment (iii) can be reduced. In addition, even in the fine fractures in the shale layer, the diverting agent of embodiment (iii) can form filling.

The lower limit of the degree of swelling is 0.

Examples of the method of adjusting the degree of swelling of the PVA-based resin used in the embodiment (iii) include a method of adjusting the degree of saponification of the PVA-based resin, a method of adjusting the average degree of polymerization of the PVA-based resin, a method of introducing a modifying group into the PVA-based resin, a method of performing heat treatment on the PVA-based resin, and a method of forming core-shell particles using the PVA-based resin.

The elution rate of the PVA-based resin used in the embodiment (iii) is preferably 50 mass % or less, more preferably 30 mass % or less, and still more preferably 10 mass % or less.

When the elution rate of the PVA-based resin used in the embodiment (iii) is 50 mass % or less, the shape of the PVA-based resin can be maintained for a certain period of time, and it can be efficiently performed to temporarily fill the fractures of the shale layer by the diverting agent of the embodiment (iii).

The lower limit of the elution rate is 0 mass %.

Examples of the method of adjusting the elution rate of the PVA-based resin used in the embodiment (iii) include a method of adjusting the degree of saponification of the PVA-based resin, a method of adjusting the average degree of polymerization of the PVA-based resin, a method of introducing a modifying group into the PVA-based resin, a method of performing heat treatment on the PVA-based resin, and a method of forming core-shell particles using the PVA-based resin.

The degree of saponification of the PVA-based resin used in the embodiment (iii) (measured according to JIS K 6726) is usually 70 mol % or more, preferably 90 mol % or more, more preferably 95 mol % or more, and still more preferably 98 mol % or more. From the viewpoint of production efficiency, the upper limit of the degree of saponification is preferably 99.9 mol % or less, more preferably 99.8 mol % or less, and still more preferably 99.5 mol % or less.

When the PVA-based resin used in the embodiment (iii) is produced by a heat treatment, the PVA-based resin can be obtained by subjecting a PVA-based resin obtained by a conventional method to heat treatment at 90° C. to 220° C., preferably from 90° C. to 180° C., and still preferably from 100° C. to 160° C., for from 10 minutes to 600 minutes, preferably from 20 minutes to 400 minutes, and more preferably from 30 minutes to 300 minutes. The heat treatment may be performed by a known method, or may be performed by melt extrusion or the like, besides a heat treatment using a heat treatment can or the like.

The PVA-based resin used in the embodiment (iii) may be an unmodified PVA or a modified PVA-based resin, and is preferably an unmodified PVA or a PVA-based resin having an ethylene group.

When the PVA-based resin used in the embodiment (iii) is produced by a method to produce core-shell particles, the resin can be obtained from a known method, for example, a method described in JP-A-2017-048267.

Production Method of PVA-Based Resin

The PVA-based resin used in the present invention has a vinyl alcohol structural unit corresponding to the degree of saponification and a vinyl acetate structural unit of an unsaponified portion.

Examples of the PVA-based resin used in the present invention include a modified PVA-based resin obtained by copolymerizing various monomers during the production of a vinyl ester resin and being saponified, and a variety of post-modified PVA-based resins obtained by introducing various functional group into an unmodified PVA by post-modification, in addition to an unmodified PVA. Such modification can be performed as long as the water dissolution rate of the PVA-based resin is not lost. In some cases, the modified PVA-based resin may be further post-modified.

Examples of monomer used for copolymerization with vinyl ester monomers in the production of a vinyl ester resin include olefins such as ethylene, propylene, isobutylene, α-octene, α-dodecene, and α-octadecene; unsaturated acids such as acrylic acid, methacrylic acid, crotonic acid, maleic acid, maleic anhydride and itaconic acid, a salt thereof, monoester thereof or dialkyl ester thereof, or the like; nitriles such as acrylonitrile and methacrylonitrile; amides such as acrylamide and methacrylamide; olefin sulfonic acid or a salt thereof such as ethylene sulfonic acid, allyl sulfonic acid, and methallyl sulfonic acid; alkyl vinyl ethers; N-acryl amide methyltrimethylammonium chloride; allyl trimethylammonium chloride; dimethylallyl vinyl ketone; N-vinyl pyrrolidone; vinyl chloride; vinylidene chloride; polyoxyalkylene (meth) allyl ether such as polyoxyethylene (meth) allyl ether and polyoxypropylene (meth) allyl ether; polyoxyalkylene (meth) acrylate such as polyoxyethylene (meth) acrylate and polyoxypropylene (meth) acrylate; polyoxyalkylene (meth) acrylamide such as polyoxyethylene (meth) acrylamide and polyoxypropylene (meth) acrylamide; polyoxyethylene (1-(meth)acrylamide-1,1-dimethylpropyl) ester; polyoxyalkylene vinyl ether such as polyoxyethylene vinyl ether and polyoxypropylene vinyl ether; polyoxyalkylene allylamine such as polyoxyethylene allylamine and polyoxypropylene allylamine; polyoxyalkylene vinylamine such as polyoxyethylene vinylamine and polyoxypropylene vinylamine; a hydroxy group-containing α-olefins such as 3-buten-1-ol, 4-penten-1-ol, and 5-hexen-1-ol, or a derivative thereof such as an acylated product thereof.

In addition, examples thereof include a compound having a diol such as 3, 4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, 5,6-diacyloxy-1-hexene, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinylethylene carbonate, 2,2-dimethyl-4-vinyl-1,3-dioxolane, or the like.

Examples of the post-modified PVA-based resin obtained by introducing functional group by post-reaction include those having an acetoacetyl group by reaction with diketene, those having a polyalkylene oxide group by reaction with ethylene oxide, those having a hydroxyalkyl group by reaction with an epoxy compound or the like, or those obtained by reacting an aldehyde compound having various functional groups with a PVA-based resin, or the like.

The PVA-based resin used in the present invention is preferably a modified PVA-based resin, and more preferably a modified PVA-based resin has a hydrophilic modifying group, from the viewpoint of further increasing the ratio of the dissolution rate after 24 hours with respect to the dissolution rate after 1 hour.

When the PVA-based resin used in the present invention is a modified PVA-based resin, the modification rate in the modified PVA resin, that is, the content of a structural unit derived from various monomers in the copolymer, or the functional group introduced by the post reaction is preferably 0.5 mol % to 10 mol %, more preferably 0.7 mol % to 8 mol %, and still more preferably 1.0 mol % to 5 mol %, from the viewpoint of increasing the ratio of the dissolution rate after 24 hours with respect to the dissolution rate after 1 hour.

The modification rate of the PVA-based resin used in the present invention can be determined from the $^1$H-NMR spectrum (solvent, DMSO-$d_6$; internal standard, tetramethylsilane) of the PVA-based resin having a degree of saponification of 100 mol %. Specifically, the modification rate can be calculated from a peak area derived from a hydroxyl proton, a methine proton, and a methylene proton in the modifying group, a methylene proton in the main chain, a proton of a hydroxyl group linked to the main chain, or the like.

Examples of the hydrophilic modifying group include an oxyalkylene group, a hydroxyl group-containing alkyl group, an amino group, an amino group-containing alkyl group, a thiol group, and a thiol group-containing alkyl group. Among these, an oxyalkylene group and a hydroxyl group-containing alkyl group are preferably used, since the effects of the present invention can be remarkably obtained.

Examples of the oxyalkylene group include an oxyethylene group and an oxyethylene-oxypropylene copolymer group. In the case of an oxyethylene-oxypropylene copolymer, since the hydrophilicity tends to decrease as the oxypropylene component increases, an oxyethylene group is preferably used.

Many examples of the hydroxyl group-containing alkyl group are given depending on the number of carbon atoms of the alkyl group, the number of hydroxyl groups, the valence of hydroxyl groups, the bonding mode, or the like. The number of carbon atoms of the alkyl group is usually 1 to 5, particularly preferably 2 to 3. The number of hydroxyl groups is usually 1 to 4, more preferably 1 to 3, and the valence number thereof is preferably a primary hydroxyl group. In particular, among these hydroxyl group-containing alkyl groups, a 1,2-diol group in which a primary hydroxyl group and a secondary hydroxyl group are bonded to adjacent carbon atoms is preferred.

Since the terminal of the oxyethylene group is usually a hydroxyl group, the oxyethylene group is contained in the hydroxyl group-containing functional group.

Further, the PVA-based resin used in the present invention may be a mixture with other different PVA-based resin, and examples of the other PVA-based resins include those having different contents of the modifying group, those having different degrees of saponification, those having different average degrees of polymerization, those having different other copolymerization components, and those having no modifying group. When a mixture is used, the average value of the degrees of saponification, the degree of polymerization, and the modification rate is preferably within the above-described range.

Further, as the PVA-based resin used in the present invention, those obtained by copolymerizing various unsaturated monomers can be used as long as the objects of the present invention are not inhibited. The introduction amount of such an unsaturated monomer is generally less than 10 mol %. When the introduction amount is too large, it is likely that the hydrophilicity is impaired.

Hereinafter, in the PVA-based resin used in the present invention, the PVA-based resin having an oxyethylene group preferably used as a modifying group in the side chain (hereinafter sometimes referred to as an oxyethylene group-containing PVA-based resin) will be described in detail.

The oxyethylene group is represented by the following general formula (1).

[Chem. 1]

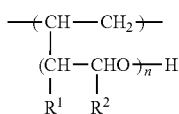
(1)

In the general formula (1), n represents a positive integer, and n is usually 5 to 50, preferably 8 to 20. n is an average value of the number of oxyethylene groups contained in the PVA-based resin.

$R^1$ and $R^2$ each represent a hydrogen atom or an alkyl group having 1 to 3 carbon atoms. Examples of the alkyl group having 1 to 3 carbon atoms include a methyl group, an ethyl group, an n-propyl group, and an isopropyl group. The alkyl group may have a substituent such as a halogen group, a hydroxyl group, an ester group, a carboxylic acid group or a sulfonic acid group as necessary.

An oxyalkylene group other than the oxyethylene group, for example, an oxypropylene group may be copolymerized in a small amount as long as the hydrophilicity is not impaired.

The oxyethylene group-containing PVA-based resin can be obtained by saponifying a modified polyvinyl ester resin obtained by copolymerizing a vinyl ester monomer and an unsaturated monomer having an oxyethylene group.

Examples of the unsaturated monomer having an oxyethylene group include various monomers, and typical examples thereof are as follows.

(Meth)Acrylic Ester Type (Meth)acrylic ester type is represented by the following formula (2), and specific examples thereof include polyoxyethylene (meth)acrylate.

[Chem. 2]

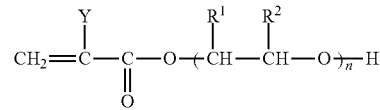
(2)

In the formula (2), Y represents a hydrogen atom or a methyl group, and n, $R^1$ and $R^2$ are the same as defined above.

(Meth)Acrylamide Type (Meth)acrylamide type is represented by the following formula (3), and specific examples thereof include polyoxyethylene (meth)acrylamide.

[Chem. 3]

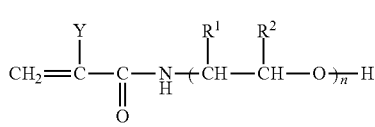
(3)

In the formula (3), Y, n, $R^1$ and $R^2$ are the same as defined above.

(Meth)allyl Ether Type (Meth)allyl Ether Type is represented by the following formula (4), and specific examples thereof include polyoxyethylene (meth)allyl ether or the like.

[Chem. 4]

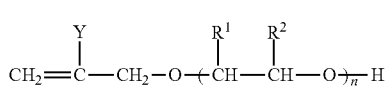
(4)

In the formula (4), Y, n, $R^1$ and $R^2$ are the same as defined above.

Vinyl Ether Type

Vinyl ether type is represented by the following formula (5), and specific examples thereof include polyoxyethylene vinyl ether, polyoxypropylene vinyl ether, or the like.

[Chem. 5]

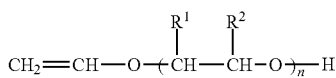

(5)

In the formula (5), n, $R^1$ and $R^2$ are the same as defined above.

Among monomers containing these oxyethylene groups, those of the (meth)allyl ether type represented by the formula (4) are preferably used from the viewpoints of ease of the copolymerization reaction, stability in the saponification step and the like.

Examples of the vinyl ester monomer copolymerizable with the above monomers include vinyl formate, vinyl acetate, vinyl trifluoroacetate, vinyl propionate, vinyl butyrate, vinyl caprate, vinyl laurate, vinyl versatate, vinyl palmitate, vinyl stearate, vinyl pivalate, or the like are used alone or in combination. Industrially, vinyl acetate is preferred.

The copolymerization is not particularly limited, and a known polymerization method is used.

Hereinafter, in the PVA-based resin used in the present invention, the PVA-based resin having a 1,2-diol group preferably used as a modifying group in the side chain (hereinafter sometimes referred to as a 1,2-diol group-containing PVA-based resin) will be described in detail.

The 1,2-diol group-containing PVA-based resin is a PVA-based resin having a 1,2-diol structural unit represented by the following general formula (6).

[Chem. 6]

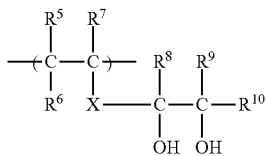

(6)

In the general formula (6), $R^5$ to $R^{10}$ each independently represent a hydrogen atom or an alkyl group having 1 to 5 carbon atoms, and X represents a single bond or a bond chain.

Examples of the alkyl group having 1 to 5 carbon atoms include a methyl group, an ethyl group, an n-propyl group, and an isopropyl group, and an n-butyl group, an isobutyl group, a tert-butyl group, and a pentyl group. The alkyl group may have a substituent such as a halogen group, a hydroxyl group, an ester group, a carboxylic acid group, or a sulfonic acid group as necessary.

All of $R^5$ to 10 are preferably hydrogen atoms, but any of $R^5$ to $R^{10}$ may be an alkyl group having 1 to 5 carbon atoms as long as the resin properties are not remarkably impaired.

X is preferably a single bond in terms of thermal stability and stability under high temperature and acidic conditions, but may be a bond chain as long as the effect of the present invention is not impaired.

The bond chain is not particularly limited, and, for example, a linear or branched alkylene group having 1 to 4 carbon atoms, a linear or branched alkenylene group having 1 to 4 carbon atoms, a linear or branched alkynylene group having 1 to 4 carbon atoms, and hydrocarbons such as phenylene group and naphthylene group (these hydrocarbons may be substituted with halogens such as fluorine, chlorine, bromine, etc.), —O—, —$(CH_2O)_m$—, —$(OCH_2)_m$—, —$(CH_2O)_mCH_2$—, —CO—, —COCO—, —$CO(CH_2)_mCO$—, —$CO(C_6H_4)CO$—, —S—, —CS—, —SO—, —$SO_2$—, —NR—, —CONR—, —NRCO—, —CSNR—, —NRCS—, —NRNR—, —$HPO_4$—, —$Si(OR)_2$—, —$OSi(OR)_2$—, —$OSi(OR)_2O$—, —$Ti(OR)_2$—, —$OTi(OR)_2$—, —$OTi(OR)_2O$—, —Al(OR)—, —OAl(OR)—, —OAl(OR)O—, or the like. R each independently represents a hydrogen atom or an optional substituent, and a hydrogen atom or an alkyl group (particularly an alkyl group having 1 to 4 carbon atoms) is preferred.

In addition, m is a natural number, preferably 1 to 10, and particularly preferably 1 to 5.

Among these, an alkylene group having 1 to 4 carbon atoms, particularly a methylene group, or —$CH_2OCH_2$— is preferred in terms of viscosity stability and heat resistance during production.

The 1,2-diol group-containing PVA-based resin can be produced by a known production method. For example, the PVA-based resin can be produced by methods described in JP-A-2002-284818, JP-A-2004-285143, and JP-A-2006-95825.

That is, the PVA-based resin can be produced by (i) a method of saponifying a copolymer of a vinyl ester monomer and a compound represented by the following general formula (7), (ii) a method of saponifying and decarboxylation of a copolymer of a vinyl ester monomer and a vinylethylene carbonate represented by the following general formula (8), and (iii) a method of saponifying and deketalizing a copolymer of a vinyl ester monomer and a 2,2-dialkyl-4-vinyl-1,3-dioxolane represented by the following general formula (9), or the like.

[Chem. 7]

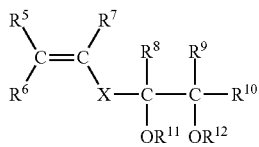

(7)

In the general formula (7), each of $R^5$ to $R^{10}$ and X is the same as defined in the general formula (6). $R^{11}$ and $R^{12}$ each independently represent a hydrogen atom or $R^{13}$—CO— (in the formula, $R^{13}$ represents an alkyl group of 1 to 5 carbon atoms.)

[Chem. 8]

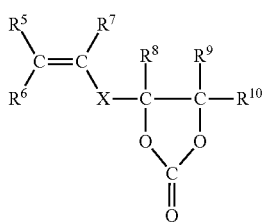

(8)

In the general formula (8), each of $R^5$ to $R^{10}$ and X is the same as defined in the general formula (6).

[Chem. 9]

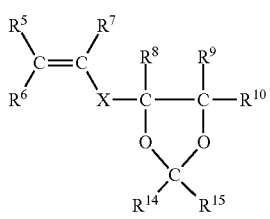

(9)

In the general formula (9), each of $R^5$ to $R^{10}$ and X is the same as defined in the general formula (6). $R^{14}$ and $R^{15}$ each independently represent a hydrogen atom or an alkyl group of 1 to 5 carbon atoms.

Specific examples of the alkyl group having 1 to 5 carbon atoms of $R^{13}$ to $R^{15}$ are the same as those in the general formula (6).

Among the above methods, the method (i) is preferred in that copolymerization reactivity and industrial handling are excellent. In particular, the compound represented by the general formula (7) is preferable to use a 3,4-diacyloxy-1-butene in which $R^5$ to $R^{10}$ are hydrogen atoms, X is a single bond, $R^{11}$ and $R^{12}$ are $R^{13}$—CO—, and $R^{13}$ is an alkyl group having 1 to 5 carbon atoms. Among these, 3,4-diacetoxy-1-butene in which $R^{13}$ is a methyl group is particularly preferably used.

In addition, it is possible to obtain the PVA-based resin of which approximately 1.6 mol % to 3.5 mol % of the 1,2-diol structure is introduced in the main chain, by setting the polymerization temperature to 100° C. or more.

Diverting Agent

The diverting agent of the present invention contains the PVA-based resin described above. The content of the PVA-based resin is usually 50 mass % to 100 mass %, preferably 80 mass % to 100 mass %, and particularly preferably 90 mass % to 100 mass % with respect to the entire diverting agent. When the content is too small, the effects of the present invention tend to be difficult to achieve.

In addition to the PVA-based resin, additives such as sand, iron, ceramic, and other biodegradable resins can be blended in the diverting agent of the present invention.

The amount of the additive blended is usually 50 mass % or less, preferably 20 mass % or less, and still more preferably 10 mass % or less with respect to the entire diverting agent.

The shape of the diverting agent of the present invention is usually a columnar shape (pellet), a spherical shape, a powder shape, or the like, and is preferably a columnar shape or a powder shape in view of improving or producing a sealing effect, and is preferably a mixture thereof when used.

In the case of the columnar shape (pellet), the diameter is usually from 0.5 mm to 4.0 mm, preferably from 1.0 trim to 3.0 mm, particularly preferably from 1.85 mm to 2.25 mm, and the thick is usually from 0.5 mm to 4.0 mm, preferably from 1.0 mm to 3.0 mm, particularly preferably from 1.85 mm to 2.25 mm.

In the case of a powder form, the average particle diameter is preferably 10 μm to 3000 μm, more preferably 50 μm to 2000 μm, and still more preferably 100 μm to 1000 μm. The average particle diameter is a diameter in which a volume distribution for each particle size is measured by laser diffraction and an integrated value (cumulative distribution) is 50%.

When the diameter, the thickness, and the average particle diameter are too large, water dissolution rate tends to decrease, and when the diameter, the thickness, and the average particle diameter are too small, the sealing effect tends to decrease.

When oil, gas, or the like is excavated in a hydraulic fracturing method, the diverting agent of the present invention enters into a formed fracture or fissure, temporarily fill the fracture or fissure, and then can form a new fracture or fissure. As a method for filling a fracture or fissure, the diverting agent of the present invention is allowed to flow into a fracture to be filled with a flow of fluid in the well.

Further, since the diverting agent of the present invention is water-soluble and biodegradable, the diverting agent is rapidly dissolved in water after use, and is then biodegraded. Therefore, environmental load is small, and the diverting agent is very useful.

It should be noted that some or all of the elements and features in the above embodiments may be appropriately combined with other embodiments.

EXAMPLE

Hereinafter, the present invention will be described in detail with reference to Examples, but the present invention is not limited thereto.

In Examples, "parts" and "%" mean mass basis unless otherwise specified.

Test Example 1

No. 1-1

Production of PVA 1-1

10 parts of vinyl acetate (10% of the total was used for initial charge) and 45 parts of methanol were added to a reaction can equipped with a reflux condenser, a dropping device, and a stirrer, the temperature was raised under a nitrogen stream while stirring. After reaching the boiling point, 0.050 parts of acetyl peroxide were charged, and polymerization was started.

After 0.28 hours from the start of polymerization, 90 parts of vinyl acetate were added dropwise at a constant speed over 22 hours. When the polymerization rate of vinyl acetate was 95%, a predetermined amount of hydroquinone monomethyl ether was added to complete the polymerization, and then distillation was performed while blowing methanol vapor in order to remove unreacted vinyl acetate monomer out of the system and obtain a methanol solution of vinyl acetate polymer.

Then, the solution was diluted with methanol, the solid content concentration was adjusted to 55%, and the methanol solution was added to a kneader. And saponification was performed by adding a methanol solution of 2% sodium in sodium hydroxide at a ratio of 6.3 mmol with respect to 1 mol of vinyl acetate structural unit while maintaining the solution temperature at 35° C. When the saponification was proceeded, the saponified product was precipitated, and particles were formed, saponification was performed by further adding a methanol solution of 2% sodium in sodium hydroxide at a ratio of 6.0 mmol with respect to 1 mol of vinyl acetate structural unit. Then, the acetic acid for neutralization was added at 0.8 equivalent of sodium hydroxide, and PVA 1-1 was obtained by filtering, washing well with methanol, and drying in a hot air drier.

The degree of saponification of the obtained PVA 1-1 was 99 mol % by analyzing the amount of alkali consumption required for hydrolysis of the structural unit of the remaining vinyl acetate in the resin.

The average degree of polymerization of PVA 1-1 was 300, based on analysis according to JIS K 6726.

Production of PVA 1-1 Pellet

The PVA 1-1 obtained above was pelletized under the following conditions.
Extruder: manufactured by Technovel Corporation, 15 mmφ, L/D=60
Rotational speed: 200 rpm
Discharge amount: 1.2 kg/h to 1.5 kg/h
Extrusion temperature: C1/C2/C3/C4/C5/C6/C7/C8/D=90/170/210/220/230/230/230/230/230° C.

The obtained PVA-based resin pellets were evaluated as follows.

Degree of Crystallinity Measurement

Five (5) mg of sample of the PVA-based resin pellets obtained above was sealed in a measurement pan, using a heat flux differential scanning calorimeter "DSC3" manufactured by Mettler Toledo, when the temperature was raised from −30° C. to 215° C. at a temperature raising rate of 10° C./min, immediately thereafter, the temperature was lowered to −30° C. at a temperature decreasing rate of 10° C./min, and raised to 230° C. at a temperature raising rate of 10° C./rain again, the heat of fusion (ΔH) of the melting point was calculated to be 69.0 J/g, and the degree of crystallinity was 44.0%.

Dissolvability Evaluation (40° C.)

Four (4) g of the PVA-based resin pellet obtained above was put into 96 g of water at 40° C. and was stirred for 180 minutes while maintaining the temperature of water at 40° C.

After 180 minutes, the residue of the PVA-based resin pellet that remained undissolved was filtered, and the concentration of the aqueous solution excluding the residue was measured. The concentration of the aqueous solution is calculated from the following formula by weighing and collecting an appropriate amount of the PVA-based resin aqueous solution, putting the solution in a drier at 105° C. and drying for 3 hours, cooling to room temperature, and then measuring the mass of the dried residue.

The concentration (mass %) of the aqueous solution=mass (parts) of dried residue/mass (parts) of the weighted and collected aqueous solution of PVA-based resin×100

The amount of residue was calculated from the concentration of the aqueous solution and the charged amount of the PVA-based resin pellet, and the dissolution rate was determined. The results are shown in Table 1-1.

No. 1-2

Evaluation was performed in the same manner as No. 1-1 except that PVA 1-1 in No. 1-1 was replaced with PVA 1-2 (a degree of saponification of 99 mol %, an average degree of polymerization of 500, an unmodified PVA). The results are shown in Table 1-4.

No. 1-3

Production of PVA 1-3

Ten (10) parts of vinyl acetate (10% of the total was used for initial charge), 45 parts of methanol, and 0.20 parts of 3,4-diacetoxy-1-butene (10% of the total was used for initial charge) were added to a reaction can equipped with a reflux condenser, a dropping device, and a stirrer, the temperature was raised under a nitrogen stream while stirring. After reaching the boiling point, 0.100 parts of acetyl peroxide were charged, and polymerization was started.

After 0.5 hours from the start of polymerization, 90 parts of vinyl acetate and 1.80 parts of 3,4-diacetoxy-1-butene were added dropwise at constant speed over 22.5 hours. When the polymerization rate of vinyl acetate was 95%, a predetermined amount of hydroquinone monomethyl ether was added to complete the polymerization, and then distillation was performed while blowing methanol vapor in order to remove unreacted vinyl acetate monomer out of the system and obtain a methanol solution of the polymer.

The above solution was then diluted with methanol, the solids concentration was adjusted to 55%, the methanol solution was charged into a kneader, and saponification was performed by adding a methanol solution of 2% sodium in sodium hydroxide at a ratio of 6.3 mmol with respect to a total amount of 1 mol of vinyl acetate structural units and 3,4-diacetoxy-1-butene structural units in the copolymer while maintaining the solution temperature at 35° C. When the saponification was proceeded, the saponified product was precipitated and particles were formed, saponification was performed by further adding a methanol solution of 2% sodium in sodium hydroxide at a ratio of 6.0 mmol with respect to 1 mol of the total amount of the vinyl acetate structural units and the 3,4-diacetoxy-1-butene structural units. Then, the acetic acid for neutralization was added at 0.8 equivalent of sodium hydroxide, PVA 1-3 having a 1,2-diol structure in the side chain was obtained by filtering, washing with methanol, drying in a hot air drier.

The degree of saponification of the obtained PVA 1-3 having a 1,2-dial structure in the side chain was 99 mol % by analyzing the amount of alkali consumption required for hydrolysis of the structural unit of the remaining vinyl acetate and 3,4-diacetoxy-1-butene in the resin.

The average degree of polymerization of PVA 1-3 was 300, based on analysis according to JIS K 6726.

The content of the 1,2-diol structural unit represented by the above formula (6) was 1.0 mol % as calculated from the integrated value measured by $^1$H-NMR (300 MHz proton NMR, $d_6$-DMSO solution, internal standard substance; tetramethylsilane, 50° C.).

Production of PVA 1-3 Pellet

The PVA. 1-3 obtained above was pelletized under the following conditions.
Extruder: manufactured by Technovel Corporation, 15 mmφ, L/D=60
Rotational speed: 200 rpm
Discharge amount: 1.2 kg/h to 1.5 kg/h
Extrusion temperature: C1/C2/C3/C4/C5/C6/C7/C8/D=90/160/200/225/230/230/230/230/230° C.

The obtained PVA-based resin pellets were evaluated as in No. 1-1.

No. 1-4

Evaluation was performed in the same manner as No. 1-3 except that PVA 1-3 in No. 1-3 was replaced by PVA 1-4 (a degree of saponification of 99 mol %, an average degree of polymerization of 600, a content of the 1,2-diol structure of 1.0 mol %).

No. 1-5

Evaluation was performed in the same manner as No. 1-3 except that PVA 1-3 in No. 1-3 was replaced by PVA 1-5 (a degree of saponification of 99 mol %, an average degree of polymerization of 450, a content of the 1,2-diol structure of 1.0 mol %).

No. 1-6

Evaluation was performed in the same manner as No. 1-3 except that PVA 1-3 in No. 1-3 was replaced by PVA 1-6 (a degree of saponification of 99 mol %, an average degree of polymerization of 500, a content of ethylene group of 7.0 mol %).

No. 1-7

Evaluation was performed in the same manner as No. 1-3 except that PVA 1-3 in No. 1-3 was replaced by PVA 1-7 (a degree of saponification of 99 mol %, an average degree of polymerization of 600, a content of the 1,2-diol structure of 1.5 mol %).

No. 1-8

Evaluation was performed in the same manner as No. 1-3 except that PVA 1-3 in No. 1-3 was replaced by PVA 1-8 (a degree of saponification of 99 mol %, an average degree of polymerization of 520, a content of the 1,2-diol structure of 2.0%) mol %).

No. 1-9

Evaluation was performed in the same manner as No. 1-3 except that PVA 1-3 in No. 1-3 was replaced by PVA 1-9 (a degree of saponification of 99 mol %, an average degree of polymerization of 600, a content of the 1,2-diol structure of 3.0 mol %).

No. 1-10

Evaluation was performed in the same manner as No. 1-3 except that PVA 1-3 in No. 1-3 was replaced by PVA 1-10 (a degree of saponification of 99 mol %, an average degree of polymerization of 470, a content of the 1,2-diol structure of 3.0 mol %).

No. 1-11

Evaluation was performed in the same manner as No. 1-1 except that PVA 1-1 in No. 1-1 was replaced by polylactic acid ("ingeo 4032D" manufactured by NatureWorks)

The results of No. 1-1 to 1-11 are shown in Table 1-1.

TABLE 1-1

| | PVA-base Resin | | | | | Dissolvability Evaluation |
| --- | --- | --- | --- | --- | --- | --- |
| | Degree of Saponification (mol %) | Average Degree of Polymerization | Modification Type | Modification Rate (mol %) | Degree of Crystallinity (%) | Dissolution Rate (mass %) (40° C., 180 minutes) |
| No. 1-1 | 99 | 300 | Unmodified | — | 44.0 | 1.5 |
| No. 1-2 | 99 | 500 | Unmodified | — | 48.8 | 0.8 |
| No. 1-3 | 99 | 300 | 1,2-diol Side-chain | 1.0 | 41.9 | 2.5 |
| No. 1-4 | 99 | 600 | 1,2-diol Side-chain | 1.0 | 38.5 | 2.3 |
| No. 1-5 | 99 | 450 | 1,2-diol Side-chain | 1.0 | 30.7 | 1.5 |
| No. 1-6 | 99 | 500 | Ethylene | 7.0 | 35.7 | 0.5 |
| No. 1-7 | 99 | 600 | 1,2-diol Side-chain | 1.5 | 31.2 | 3.2 |
| No. 1-8 | 99 | 520 | 1,2-diol Side-chain | 2.0 | 30.6 | 37.9 |
| No. 1-9 | 99 | 600 | 1,2-diol Side-chain | 3.0 | 26.3 | 96.0 |
| No. 1-10 | 99 | 470 | 1,2-diol Side-chain | 3.0 | 27.9 | 99.5 |
| No. 1-11 | | | Polylactic Acid | | | 0 |

As described above, since No. 1-1 to 1-10 using the diverting agent of the present invention are dissolved in water, they are immediately removed after temporarily sealing fractures and fissures.

That is, an appropriate diverting agent can be selected depending on various purposes, such as a case where it is desired to design a long time to fill the gap or a case where it is desired to design a shorter removal time after the gap is filled for a certain period of time.

On one hand, since the polylactic acid does not dissolve in water in No. 1-11 using the polylactic acid, it is possible to fill the gap for a certain period of time, but it is found that it takes a long time to remove the polylactic acid after the purpose is achieved.

Test Example 2

The production methods of PVA2-1 to PVA2-16 used in Test Example 2 are as follows.

Production of PVA2-1

Twenty (20) parts of vinyl acetate (20% of the total was used for initial charge), 32.5 parts of methanol, and 0.40 parts of 3,4-diacetoxy-1-butene (20% of the total was used for initial charge) were added to a reaction can equipped with a reflux condenser, a dropping device, and a stirrer, and the temperature was raised under a nitrogen stream while stirring. After reaching the boiling point, 0.093 parts of acetyl peroxide were charged, and polymerization was started.

After 0.4 hours from the start of polymerization, 80 parts of vinyl acetate and 1.6 parts of 3,4-diacetoxy-1-butene were dropped at constant speed over 11 hours. When the polymerization rate of vinyl acetate was 91%, a predetermined amount of m-dinitrobenzene was added to complete the polymerization, and then distillation was performed while blowing methanol vapor to remove unreacted vinyl acetate monomer out of the system to obtain a methanol solution of the polymer.

The above solution was then diluted with methanol, the solids concentration was adjusted to 50%, the methanol solution was charged into a kneader, and saponification was performed by adding a methanol solution of 2% sodium in sodium hydroxide at a ratio of 4.8 mmol with respect to a total amount of 1 mol of vinyl acetate structural units and 3,4-diacetoxy-1-butene structural units in the copolymer while maintaining the solution temperature at 35° C. When the saponified product was precipitated and became particulate as the saponification was proceeded, 7.5 mmol of a methanol solution of 2% sodium in sodium hydroxide was further added to the total amount of 1 mol of the vinyl acetate structural units and the 3,4-diacetoxy-1-butene structural units, and the saponification was performed. Then, 0.8 equivalent of sodium hydroxide was added to the acetic acid for neutralization, filtered off, washed with methanol, dried in a hot air drier, and a modified PVA-based resin (PVA2-1) having a 1,2-diol structural unit in the side chain was obtained.

Degree of Saponification

The degree of saponification of the PVA2-1 was 99 mol % when analyzed using the amount of alkali consumption required for hydrolysis of the structural unit of the remaining vinyl acetate and 3,4-diacetoxy-1-butene in the resin according to JIS K 6726.

Average Degree of Polymerization

The average degree of polymerization of PVA2-1 was 450 when analyzed according to JIS K 6726.

Modification Rate

The content rate (modification rate) of the 1,2-diol structural unit represented by the formula (6) in PVA2-1 was 1.0 mol % as calculated from the integrated value measured by $^1$H-NMR (300 MHz proton NMR, $d_6$-DMSO solution, internal standard substance; tetramethylsilane, 50° C.).

Average Particle Diameter

The average particle diameter of the PVA2-1 was 270 μm as measured by a laser diffraction type particle size distribution analyzer "Mastersizer 3000" (manufactured by Spectris Co., Ltd.).

Production of PVA2-2

A modified PVA-based resin containing 1,2-diol structural unit in the side chain was obtained in the same manner as the production of PVA2-1, except that 100 parts of vinyl acetate, 23 parts of methanol, and 6 parts of 3,4-diacetoxy-1-butene were charged in an initial batch, and the polymerization was terminated at a polymerization rate of 70%. The sieved product obtained by sieving the modified PVA-based resin with a. 300 μm sieve was named as PVA2-2.

The degree of saponification, the average degree of polymerization, the modification rate, and the average particle diameter were determined in the same manner as in the PVA2-1. The degree of saponification was 99 mol %, the average degree of polymerization was 1200, the modification rate was 3.0 mol %, and the average particle diameter was 415 μm.

Production of PVA2-3

A modified PVA-based resin containing 1,2-diol structural unit in the side chain was obtained in the same manner as the production of PVA2-1, except that 100 parts of vinyl acetate, 23 parts of methanol, and 2 parts of 3,4-diacetoxy-1-butene were charged in an initial batch, and the polymerization was terminated at a polymerization rate of 58%. The sieved product obtained by sieving the modified PVA-based resin with a 300 μm sieve was named as PVA2-3.

The degree of saponification, the average degree of polymerization, the modification rate, and the average particle diameter were determined in the same manner as the PVA2-1. The degree of saponification was 99 mol %, the average degree of polymerization was 1800, the modification rate was 1.0 mol %, and the average particle diameter was 410 μm.

Production of PVA2-4

15.0 parts of polyoxyethylene monoallylether having oxyethylene group having an average chain length (n) of 15, 85 parts of vinyl acetate, and 10.0 parts of methanol were charged into a polymerization can, were heated up to a reflux state, and then were refluxed for 30 minutes After that, 0.08 mol % of azobisisobutyronitrile was added with respect to the amount of vinyl acetate, and polymerization was started. At each of 2 and 4 hours after the start of the reaction, azobisisobutyronitrile was added in an amount of 0.08 mol % with respect to the amount of the vinyl acetate.

Then, 0.2 parts of m-dinitrobenzene as an inhibitor was added to 20 parts of methanol for cooling at approximately 10 hours after the start of the polymerization reaction, and the reaction can jacket was cooled to stop the polymerization reaction to obtain a polyoxyethylene group-containing vinyl acetate polymer. The polymerization rate of the polymer was approximately 95%.

Subsequently, the residual monomer was removed from the solution of the polyoxyethylene group-containing vinyl acetate polymer obtained above, adjusted to a concentration of 40% by diluting with methanol and charged into a kneader, and then saponification was performed by adding a methanol solution of 2% sodium hydroxide in an amount of 3.5 mmol with respect to 1 mol of vinyl acetate in the copolymer while maintaining the solution temperature at 35° C. The saponified product was precipitated and became particulate as the saponification was proceeded. The produced resin was filtered off, washed well with methanol, and dried in a hot air drier to obtain an oxyethylene group-containing PVA-based resin (PVA2-4).

The degree of saponification, the average degree of polymerization, the modification rate, and the average particle diameter were determined in the same manner as in the PVA2-1. The degree of saponification was 99 mol %, the average degree of polymerization was 750, the modification rate was 2.0 mol %, and the average particle diameter was 287 μm.

Production of PVA2-5

Unmodified PVA with a degree of saponification of 73 mol % and an average degree of polymerization of 500 was subjected to a heat treatment at 140° C. for 2 hours in a constant-temperature dryer to obtain PVA2-5. The average particle diameter of the obtained PVA2-5 was 240 μm.

Production of PVA2-6

The PVA2-1 was subjected to a heat treatment at 140° C. for 2 hours in a constant-temperature dryer to obtain PVA2-6.

The degree of saponification, the average degree of polymerization, the modification rate, and the average particle diameter were determined in the same manner as in the PVA2-1. The degree of saponification was 99 mol %, the average degree of polymerization was 450, the modification rate was 1.0 mol %, and the average particle diameter was 270 μm.

Production of PVA2-7

A rolling flow coating apparatus (MP-01 manufactured by Powrex Corporation) was used, 700 parts of finely pulverized particles (degree of saponification degree of 88 mol %, average degree of polymerization of 500, average particle diameter of 100 μm) of PVA2-8 described below as a core part and 700 parts of a 3% aqueous solution of PVA2-15 (degree of saponification of 99 mol %, average degree of polymerization of 500, average particle diameter of 258 mi) described later (resin content, 21 parts) as a shell part are coated under the following conditions. Thus, core-shell particles of PVA2-7 were obtained.

The average particle diameter was determined in the same manner as PVA2-1. The average particle diameter was 183 μm.

Coating Conditions
Time: 100 minutes
Air supply temperature: 80° C.
Exhaust temperature: 40° C.
Spray speed: 4.5 g/min (40 min) and 7.5 g/min (60 min)
Rotor rotation speed: 300 rpm/min Production of PVA2-8

A modified PVA-based resin containing a 1,2-diol structural unit in a side chain was obtained as PVA2-8.

The degree of saponification, the average degree of polymerization, the modification rate, and the average particle diameter were determined in the same manner as the PVA2-1. The degree of saponification was 99 mol %, the average degree of polymerization was 600, the modification rate was 1.5 mol %, and the average particle diameter was 594 μm.

Production of PVA2-9

A modified PVA-based resin containing an acetoacetyl group was obtained as PVA2-9.

The degree of saponification, the average degree of polymerization, the modification rate, and the average particle diameter were determined in the same manner as the PVA2-1. The degree of saponification degree was 99 mol %, the average degree of polymerization was 1100, the modification rate was 5.5 mol %, and the average particle diameter was 245 μm.

Production of PVA2-10

A carboxylic acid-modified PVA-based resin was obtained as PVA2-10.

The degree of saponification, the average degree of polymerization, the modification rate, and the average particle diameter were determined in the same manner as the PVA2-1. The degree of saponification degree was 99 mol %, the average degree of polymerization was 1700, the modification rate was 2.0 mol %, and the average particle diameter was 1100 μm.

Production of PVA2-11

A modified PVA-based resin containing a 1,2-diol structural unit in a side chain was obtained as PVA2-11.

The degree of saponification, the average degree of polymerization, the modification rate, and the average particle diameter were determined in the same manner as the PVA2-1. The degree of saponification was 99 mol %, the average degree of polymerization was 1200, the modification rate was 1.0 mol %, and the average particle diameter was 215 μm.

Production of PVA2-12

A modified PVA-based resin containing a 1,2-diol structural unit in a side chain was obtained as PVA2-12.

The degree of saponification, the average degree of polymerization, the modification rate, and the average particle diameter were determined in the same manner as the PVA2-1. The degree of saponification degree was 92 mol %, the average degree of polymerization was 2500, the modification rate was 2.0 mol %, and the average particle diameter was 600 μm.

Production of PVA2-13

An unmodified PVA having a degree of saponification of 88 mol % and an average degree of polymerization of 500 was produced as PVA2-13.

The average particle diameter was determined in the same manner as PVA2-1. The average particle diameter was 300 μm.

Production of PVA2-14

An unmodified PVA having a degree of saponification of 73 mol % and an average degree of polymerization of 500 was produced as PVA2-14.

The average particle diameter was determined in the same manner as PVA2-1. The average particle diameter was 240 μm.

Production of PVA2-15

An unmodified PVA having a degree of saponification of 99 mol % and an average degree of polymerization of 500 was produced as PVA2-15.

The average particle diameter was determined in the same manner as PVA2-1. The average particle diameter was 258 µm.

Production of PVA2-16

An unmodified PVA having a degree of saponification of 99 mol % and an average degree of polymerization of 1800 was produced as PVA2-16.

The average particle diameter was determined in the same manner as PVA2-1. The average particle diameter was 259 µm.

No. 2-1

Dissolution Rate after 1 Hour

A 140 mL glass container with a lid containing 100 g of water was placed in a thermostatic chamber, and the water temperature was set to 40° C. The long sides of 120 mesh (aperture 125 µm, 10 cm×7 cm) made of nylon were folded in half, and both ends were heat-sealed to obtain a mesh bag (5 cm×7 cm).

One (1) g of the PVA2-1 was put into the obtained mesh bag, and the opening was heat-sealed. Then, a mesh bag containing the PVA2-1 was obtained, and the mass was measured. The mesh bag containing the PVA2-1 was immersed in the glass container. The mesh bag containing the PVA2-1 was taken out from the glass container after standing for 1 hour at a thermostatic chamber at 40° C. and then dried at 105° C. for 3 hours. The mass of the mesh bag containing the PVA2-1 was measured, the mass of the PVA2-1 remaining in the mesh bag was calculated from the mass before immersion, and the dissolution rate after 1 hour of the PVA2-1 was calculated by the following formula (Y). The dissolution rate after 1 hour was 25 mass %.

[Equation 6]

$$\text{Dissolution rate after 1 hour of the immersion (mass \%)} = \left\{ \frac{1(g) - \frac{\text{Mass (g) of the polyvinyl alcohol-based resin remaining in the mesh bag}}{\frac{\text{Solid fraction (mass \%) of polyvinyl alcohol-based resin}}{100}}}{1(g) \times \frac{\text{Solid fraction (mass \%) of polyvinyl alcohol-based resin}}{100}} \right\} \times 100 \quad (Y)$$

Dissolution Rate after 24 Hours

The dissolution rate after 24 hours of PVA 2-1 can be calculated by calculating the mass of the PVA2-1 remaining in the mesh bag after 24 hours in the same manner except that standing for 1 hour in the step of calculating the dissolution rate after 1 hour is changed to standing for 24 hours. The dissolution rate after 24 hours was 74 mass %.

In the PVA2-1, the ratio of the dissolution rate after 24 hours with respect to the dissolution rate after 1 hour determined by the dissolution rate (mass %) after 24 hours/the dissolution rate (mass %) after 1 hour was 3.0.

The dissolution rate (mass %) after 1 hour of PVA2-1, the dissolution rate (mass %) after 24 hours (mass %), and a ratio of the dissolution rate after 24 hours with respect to the dissolution rate after 1 hour were collected in Table 2-1.

No. 2-2 to No. 2-16

The same test as in No. 2-1 was performed. using PVA2-2 to PVA2-16 instead of PVA2-1 in No. 2-1. The results are shown in Tables 2-1 to 2-2.

TABLE 2-1

| | Type of PVA | Degree of Saponification (mol %) | Average Degree of Polymerization | Modification Type | Modification Rate (mol %) | Average Particle Diameter (µm) | Heat Treatment | Dissolution Rate after 1 Hour (mass %) | Dissolution Rate after 24 Hours (mass %) | Dissolution Rate after 24 Hours (mass %)/ Dissolution Rate after 1 Hour (mass %) |
|---|---|---|---|---|---|---|---|---|---|---|
| No. 2-1 | PVA2-1 | 99 | 450 | 1,2-diol Side-chain | 1.0 | 270 | NULL | 25 | 74 | 3.0 |
| No. 2-2 | PVA2-2 | 99 | 1200 | 1,2-diol Side-chain | 3.0 | 415 | NULL | 10 | 68 | 6.8 |
| No. 2-3 | PVA2-3 | 99 | 1800 | 1,2-diol Side-chain | 1.0 | 410 | NULL | 6 | 33 | 5.5 |
| No. 2-4 | PVA2-4 | 99 | 750 | Oxyethylene Group | 2.0 | 287 | NULL | 16 | 94 | 5.9 |
| No. 2-5 | PVA2-5 | 73 | 500 | Unmodified | — | 240 | 140° C. 2 Hours | 20 | 99 | 5.0 |
| No. 2-6 | PVA2-6 | 99 | 450 | 1,2-diol Side-chain | 1.0 | 270 | 140° C. 2 Hours | 9 | 69 | 7.7 |
| No. 2-7 | PVA2-7 | Core Part 88 Shell Part 99 | Core Part 500 Shell Part 500 | Unmodified | — | 183 | NULL | 27 | 95 | 3.5 |

TABLE 2-2

| | Type of PVA | Degree of Saponification (mol %) | Average Degree of Polymerization | Modification Type | Modification Rate (mol %) | Average Particle Diameter (μm) | Heat Treatment | Dissolution Rate after 1 Hour (mass %) | Dissolution Rate after 24 Hours (mass %) | Dissolution Rate after 24 Hours (mass %)/ Dissolution Rate after 1 Hour (mass %) |
|---|---|---|---|---|---|---|---|---|---|---|
| No. 2-8 | PVA2-8 | 99 | 600 | 1,2-diol Side-chain | 1.5 | 594 | NULL | 14 | 5 | 5.0 |
| No. 2-9 | PVA2-9 | 99 | 1100 | Acetoacetyl Group | 5.5 | 245 | NULL | 5 | 54 | 10.8 |
| No. 2-10 | PVA2-10 | 99 | 1700 | Carboxylic Acid | 2.0 | 1100 | NULL | 7 | 99 | 14.1 |
| No. 2-11 | PVA2-11 | 99 | 1200 | 1,2-diol Side-chain | 1.0 | 215 | NULL | 0.1 | 34 | 340 |
| No. 2-12 | PVA2-12 | 92 | 2500 | 1,2-diol Side-chain | 2.0 | 600 | NULL | 7 | 99 | 14.1 |
| No. 2-13 | PVA2-13 | 88 | 500 | Unmodified | — | 300 | NULL | 35 | 91 | 2.6 |
| No. 2-14 | PVA2-14 | 73 | 500 | Unmodified | — | 240 | NULL | 36 | 98 | 2.7 |
| No. 2-15 | PVA2-15 | 99 | 500 | Unmodified | — | 258 | NULL | 7 | 15 | 2.1 |
| No. 2-16 | PVA2-16 | 99 | 1800 | Unmodified | — | 259 | NULL | 9 | 14 | 1.6 |

The diverting agent of No. 2-1 to No. 2-12 has the further suppressed initial dissolution rate after 1 hour and the more excellent dissolution rate after 24 hours in water.

A diverting agent containing a PVA-based resin of which a ratio of a dissolution rate of 24 hours with respect to a dissolution rate after 1 hour is 2.8 or more tends to be able to maintain the shape for a certain period of time after being added to water, so that the diverting agent is easy to temporarily fill fractures formed in the shale layer and easily dissolved in water when petroleum or natural gas or the like is collected.

Test Example 3

The production methods of PVA3-1 to PVA3-6 used in Test Example 3 are as follows.

Production of PVA3-1

One hundred (100) parts of vinyl acetate, 23 parts of methanol, and 2 parts of 3,4-diacetoxy-1-butene were added to a reaction can equipped with a reflux condenser, a dropping device, and a stirrer, the temperature was raised under a nitrogen stream while stirring. After reaching the boiling point, 0.014 parts of acetyl peroxide were charged, and polymerization was started.

When the polymerization rate of vinyl acetate was 58%, a predetermined amount of m-dinitrobenzene was added to complete the polymerization, and then distillation was performed while blowing methanol vapor to remove unreacted vinyl acetate monomer out of the system to obtain a methanol solution of the polymer.

Then, the above solution was then diluted with methanol, the solids concentration was adjusted to 50%, the methanol solution was charged into a kneader, and saponification was performed by adding a methanol solution of 2% sodium in sodium hydroxide at a ratio of 4.1 mmol with respect to a total amount of 1 mol of vinyl acetate structural units and 3,4-diacetoxy-1-butene structural units in the copolymer while maintaining the solution temperature at 35° C. When the saponified product was precipitated and became particulate as the saponification was proceeded, 7.5 mmol of a methanol solution of 2% sodium in sodium hydroxide was further added with respect to the total amount of 1 mol of the vinyl acetate structural units and the 3,4-diacetoxy-1-butene structural units, and the saponification was performed. Then, the acetic acid for neutralization was added at 1.0 equivalent of sodium hydroxide, and a modified PVA-based resin having a 1,2-diol structural unit in the side chain was obtained by filtering, washing with methanol, drying in a hot air drier. The sieved product obtained by sieving the modified PVA-based resin with a 300 μm sieve was named as PVA3-1.

Degree of Saponification

The degree of saponification of the PVA3-1 was 99 mol % when analyzed using the amount of alkali consumption required for hydrolysis of the structural unit of the remaining vinyl acetate and 3,4-diacetoxy-1-butene in the resin according to JIS K 6726.

Average Degree of Polymerization

The average degree of polymerization of PVA3-1 was 1800 when analyzed according to JIS K 6726.

Modification Rate

The content rate (modification rate) of the 1,2-diol structural unit represented by the formula (1) in PVA3-1 was 1 mol % as calculated from the integrated value measured by $^1$H-NMR (300 MHz proton NMR, $d_6$-DMSO solution, internal standard substance; tetramethylsilane, 50° C.).

Average Particle Diameter

The average particle diameter of the PVA3-1 was 410 μm as measured by a laser diffraction type particle size distribution analyzer "Mastersizer 3000" (manufactured by Spectris Co. Ltd.).

Degree of Swelling and Elution Rate

A 140 mL glass container with a lid was charged with 100 g of ion-exchanged water, and 1 g of PVA3-1 was added to prepare a PVA3-1 aqueous solution, and then was left to stand for 1 day in a thermostatic chamber at 23° C. Then, the PVA3-1 aqueous solution was filtered through a 120 mesh (opening 125 μm) made of nylon, and the mass of PVA3-1 (PVA3-1 after swelling) remaining on the sieve was measured. Next, the PVA3-1 after swelling was dried at 140° C. for 3 hours, and the mass of PVA3-1 after drying was measured. The degree of swelling of PVA3-1 was 16 by determining by the following formula (B).

[Equation 7]

$$\text{Degree of swelling} = \frac{\text{Mass (g) of polyvinyl alcohol-based resin after swelling} - \text{mass (g) of polyvinyl alcohol-based resin dried after swelling}}{\text{mass (g) of polyvinyl alcohol-based resin dried after swelling}} \quad (B)$$

The elution rate (mass %) of PVA3-1 was 29 mass % by determining by the following formula (C).

In the following formula (C), the solid fraction (mass %) of the polyvinyl alcohol-based resin can be calculated by drying the PVA-based resin at 105° C. for 3 hours and measuring the mass of the PVA-based resin before and after drying.

[Equation 8]

$$\text{Elution rate (mass \%)} = \left\{ \frac{1\,(g) - \dfrac{\text{Mass (g) of polyvinyl alcohol-based resin dried after swelling}}{\dfrac{\text{Solid fraction (mass \%) of polyvinyl alcohol-based resin}}{100}}}{1\,(g) \times \dfrac{\text{alcohol-based resin}}{100}} \right\} \times 100 \quad (C)$$

Of PVA3-1, the value of the degree of swelling×elution rate was 464.

Production of PVA3-2

An unmodified PVA having a degree of saponification of 99 mol % and an average degree of polymerization of 1800 was produced as PVA3-2.

The average particle diameter, the degree of swelling, and the elution rate were determined in the same manner as PVA3-1. The average particle diameter was 259 μM, the degree of swelling was 3, the elution rate was 8 mass %, and the value of the degree of swelling×elution rate was 24.

Production of PVA3-3>

An unmodified PVA having a degree of saponification of 99 mol % and an average degree of polymerization of 500 was produced as PVA3-3.

The average particle diameter, the degree of swelling, and the elution rate were determined in the same manner as PVA3-1. The average particle diameter was 258 μm, the degree of swelling was 2, the elution rate was 8 mass %, and the value of the degree of swelling×elution rate was 16.

Production of PVA3-4

A modified PVA-based resin containing 1,2-diol structural unit in the side chain was obtained in the same manner as in the production of PVA3-1, except that 100 parts of vinyl acetate, 23 parts of methanol, and 2 parts of 3,4-diacetoxy-1-butene were charged in an initial batch, and the polymerization was terminated at a polymerization rate of 70%. The modified PVA-based resin was put in a constant-temperature dryer set to 140° C., and was subjected to a heat treatment for 2 hours to obtain a modified PVA-based resin as PVA3-4.

The degree of saponification, the average degree of polymerization, the modification rate, the average particle diameter, the degree of swelling, and the elution rate were determined in the same manner as the PVA3-1. The degree of saponification degree was 99 mol %, the average degree of polymerization was 1100, the modification rate was 1 mol %, the average particle diameter was 400 μm, the degree of swelling was 8, the elution rate is 20 mass %, and the degree of swelling×elution rate was 160.

Production of PVA3-5

A modified PVA resin containing an ethylene group having a degree of saponification of 99 mol % and an average degree of polymerization of 500 was used as PVA3-5.

The average particle diameter, the degree of swelling, and the elution rate were determined in the same manner as PVA3-1. The average particle diameter was 700 μm, the degree of swelling was 6, the elution rate was 2 mass %, and the value of the degree of swelling×elution rate was 12.

Production of PVA3-6

An unmodified PVA having a degree of saponification of 88 mol % and an average degree of polymerization of 500 was produced as PVA3-6.

The average particle diameter, the degree of swelling, and the elution rate were determined in the same manner as PVA3-1. The average particle diameter was 300 μm, the degree of swelling was 11, the elution rate was 82 mass %, and the value of the degree of swelling×elution rate was 902.

No. 3-1

A 140 mL glass container with a lid was charged with 100 g of ion exchanged water and rotator, and as stirred at 750 rpm at room temperature. While stirring, 6 g of PVA 3-1 was charged, and stirring was continued for 1 minute to obtain an aqueous dispersion of PVA3-1. After that, stirring was stopped and the aqueous dispersion of PVA3-1 was allowed to stand for 5 minutes, and the aqueous dispersion of PVA3-1 was stirred again at 750 rpm for 30 seconds, and the state of the aqueous dispersion of PVA3-1 at that time was visually observed and evaluated based on the following criteria. The results are shown in Table 3-1.

A: The PVA-based resin was uniformly dispersed in an aqueous solution.

B: Immediately after stirring, the PVA-based resin was dispersed in an aqueous solution. When the stirring was continued, the PVA-based resin particles swelled and was difficult to be stirred.

C: The PVA-based resin was adhered to each other, and the PVA-based resin was not uniformly dispersed in the aqueous solution.

No. 3-2 to No. 3-6

The same test as in No. 3-1 was performed using PVA3-2 to PVA3-6 instead of PVA3-1 in No. 3-1. The results are shown in Table 3-1.

TABLE 3-1

| | Type of PVA | Degree of Saponification (mol %) | Average Degree of Polymerization | Modification Type | Modification Rate (mol %) | Heat Treatment | Average Particle Diameter (μm) | Degree of Swelling | Elution Rate (mass %) | Degree of Swelling × Elution Rate | Dispersion Test |
|---|---|---|---|---|---|---|---|---|---|---|---|
| No. 3-1 | PVA3-1 | 99 | 1800 | 1,2-diol Side-chain | 1 | NULL | 410 | 16 | 29 | 464 | B |
| No. 3-2 | PVA3-2 | 99 | 1800 | Unmodified | — | NULL | 259 | 3 | 8 | 24 | A |
| No. 3-3 | PVA3-3 | 99 | 500 | Unmodified | — | NULL | 258 | 2 | 8 | 16 | A |
| No. 3-4 | PVA3-4 | 99 | 1100 | 1,2-diol Side-chain | 1 | 140° C. 2 Hours | 400 | 8 | 20 | 160 | A |
| No. 3-5 | PVA3-5 | 99 | 500 | Ethylene | 7 | NULL | 700 | 6 | 2 | 12 | A |
| No. 3-6 | PVA3-6 | 88 | 500 | Unmodified | — | NULL | 300 | 11 | 82 | 902 | C |

From the results in Table 3-1, it was found that No. 3-1 to No. 3-5 using a PVA-based resin of which a value of the degree of swelling×elution rate is 500 or less had better dispersibility of the PVA-based resin in the aqueous solution than that of No. 3-6.

It was found that No. 3-1 to No. 3-5 having a higher degree of saponification than that of No. 3-6 had better dispersibility of the PVA-based resin in the aqueous solution.

Furthermore, it was found that the values of the degree of swelling×elution rate of No. 3-2 and No. 3-3 using an unmodified PVA and No. 3-5 using an ethylene-modified PVA-based resin were lower among No. 3-1 to No. 3-5.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2017-155040) filed on Aug. 10, 2017, Japanese Patent Application (Patent Application No. 2017-254842) filed on Dec. 28, 2017, and Japanese Patent Application (Patent Application No. 2017-254843) filed on Dec. 28, 2017, the contents of which are incorporated herein by reference.

The invention claimed is:

1. A diverting agent comprising:
a polyvinyl alcohol-based resin, wherein
an average degree of polymerization of the polyvinyl alcohol-based resin is from 150 to 4000; and
the polyvinyl alcohol-based resin has a dissolution rate of 0.1 mass % to 30 mass %, when 4 g of the polyvinyl alcohol-based resin is charged into 96 g of water and is stirred for 180 minutes at 40° C.

2. The diverting agent according to claim 1, wherein the polyvinyl alcohol-based resin has a degree of saponification of 90 mol % or more.

3. The diverting agent according to claim 1, wherein a degree of crystallinity of the polyvinyl alcohol-based resin is 25% to 60%.

4. The diverting agent according to claim 1, wherein when 1 g of the polyvinyl alcohol-based resin is immersed in 100 g of water at 40° C., a ratio of a dissolution rate after 24 hours with respect to a dissolution rate after 1 hour of the polyvinyl alcohol-based resin is 2.8 or more.

5. The diverting agent according to claim 4, wherein when 1 g of the polyvinyl alcohol-based resin is immersed in 100 g of water at 40° C., the dissolution rate after 1 hour is less than 30 mass %.

6. The diverting agent according to claim 4, wherein when 1 g of the polyvinyl alcohol-based resin is immersed in 100 g of water at 40° C., the dissolution rate after 24 hours is 30 mass % or more.

7. The diverting agent according to claim 4, wherein the polyvinyl alcohol-based resin is a modified polyvinyl alcohol-based resin.

8. The diverting agent according to claim 7, wherein a modification rate of the modified polyvinyl alcohol-based resin is 0.5 mol % to 10 mol %.

9. The diverting agent according to claim 1, wherein the polyvinyl alcohol-based resin satisfies formula (A):

$$\text{degree of swelling} \times \text{elution rate (mass \%)} \leq 500 \quad (A)$$

wherein the degree of swelling is a value determined according to formula (B):

$$\text{Degree of swelling} = \frac{\text{Mass (g) of polyvinyl alcohol-based resin after swelling} - \text{mass (g) of polyvinyl alcohol-based resin dried after swelling}}{\text{mass (g) of polyvinyl alcohol-based resin dried after swelling}} \quad (B)$$

wherein a mass in grams of the polyvinyl alcohol-based resin after swelling is the mass of a residual polyvinyl alcohol-based resin obtained by charging 1 g of a polyvinyl alcohol-based resin into 100 g of water, leaving it to stand for 1 day in a thermostatic chamber at 23° C., collecting a filtrate by filtration, and drying the filtrate at 140° C. for 3 hours, and wherein the elution rate, in mass %, is a value determined according to formula (C):

$$\text{Elution rate (mass \%)} = \left\{ \frac{1 \text{ (g)} - \text{Mass (g) of polyvinyl alcohol-based resin dried after swelling}}{1 \text{ (g)} \times \frac{\text{Solid fraction (mass \%) of polyvinyl alcohol-based resin}}{100}} \right\} \times 100 \quad (C)$$

wherein the mass of the polyvinyl alcohol-based resin dried after swelling is the same as defined for formula (B).

10. The diverting agent according to claim 9, wherein the elution rate of the polyvinyl alcohol-based resin is 50 mass % or less.

11. The diverting agent according to claim 9, wherein the degree of swelling of the polyvinyl alcohol-based resin is 30 or less.

12. A method of filling a fracture which is a method of temporarily filling the fracture generated in a well, comprising:
 allowing the diverting agent according to claim 1 to flow into a fracture to be filled with a flow of fluid in the well.

* * * * *